United States Patent
Chang

(10) Patent No.: US 7,605,891 B2
(45) Date of Patent: Oct. 20, 2009

(54) TRANSREFLECTIVE LIQUID CRYSTAL DISPLAY

(75) Inventor: Ching Chao Chang, Tao-Yuan Hsien (TW)

(73) Assignee: Hannstar Display Corporation, Hsien (TW)

( * ) Notice: Subject to any disclaimer, the term of this patent is extended or adjusted under 35 U.S.C. 154(b) by 123 days.

(21) Appl. No.: 11/767,343

(22) Filed: Jun. 22, 2007

(65) Prior Publication Data

US 2008/0316401 A1  Dec. 25, 2008

(51) Int. Cl.
    G02F 1/1335  (2006.01)
(52) U.S. Cl. .......... 349/114; 349/106; 349/108; 349/109; 349/113
(58) Field of Classification Search .......... 349/114, 349/113, 106, 104, 115, 109, 5, 68, 67, 79, 349/80, 108
    See application file for complete search history.

(56) References Cited

U.S. PATENT DOCUMENTS

| 7,218,366 B2* | 5/2007 | Nakamura et al. | 349/114 |
| 7,463,319 B2* | 12/2008 | Roh | 349/114 |
| 2004/0212764 A1* | 10/2004 | Tanaka et al. | 349/114 |
| 2006/0098143 A1* | 5/2006 | Nakamura et al. | 349/106 |
| 2006/0187386 A1* | 8/2006 | Roh | 349/114 |
| 2008/0084376 A1* | 4/2008 | Hirota et al. | 345/88 |
| 2008/0088754 A1* | 4/2008 | Hu et al. | 349/33 |
| 2008/0316401 A1* | 12/2008 | Chang | 349/114 |

OTHER PUBLICATIONS

Yoon et al., P-6: Development of the RGBW TFT-LCD with Data Rendering Innovation Matrix (DRIM), 2005, SID 05 Digest, pp. 244-247.

* cited by examiner

*Primary Examiner*—Brian M Healy
(74) *Attorney, Agent, or Firm*—Connolly Bove Lodge & Hutz LLP

(57) ABSTRACT

A transreflective liquid crystal display comprises a plurality of pixels. Each pixel includes at least four subpixels including a white subpixel, a red subpixel, a green subpixel and a blue subpixel. Each subpixel comprises a transmissive area and a reflective area. The reflective area of the white subpixel is smaller than that of each of the R, G, and B subpixels so that the percentages of effective output light of the white subpixel and the other colored subpixels are consistent in both reflective and transmissive modes.

16 Claims, 4 Drawing Sheets

TRANSREFLECTIVE LIQUID CRYSTAL DISPLAY

BACKGROUND OF THE INVENTION

1. Field of the Invention

The present invention relates to a transreflective liquid crystal display (LCD), and more particularly, to an RGBW transreflective LCD with improved image quality.

2. Description of the Related Art

LCDs are among the most widely used flat panel display devices. Generally, an LCD includes a pair of panels each having an electrode on inner surface, and a dielectric anisotropic liquid crystal layer interposed between the panels. In the LCD, the variation of the voltage difference between the field generating electrodes, e.g., the variation in the strength of an electric field generated by the electrodes, changes the transmittance of the light passing through the LCD, and thus desired images are obtained by controlling the voltage difference between the electrodes.

Depending on the type of the light source used for image display, an LCD may be classified as one of the following three types: a transmissive LCD, a reflective LCD, and a transreflective LCD. The transmissive LCD utilizes a backlight module as the light source, and the reflective LCD utilizes ambient light to illuminate the pixels from a front side. The transreflective LCD combines the transmissive and the reflective characteristics. Under medium light conditions such as an indoor environment or under complete darkness conditions, transreflective LCDs operate in the transmissive mode, while under bright conditions such as in an outdoor environment, they operate in the reflective mode.

Recently, an RGBW technology, in which a white subpixel is added to a set of red, green and blue subpixels, has been developed to improve the brightness of LCD panels. This technology can further enhance the resolution of an LCD by a rendering method. In the subpixel rendering method, red, green, blue and white subpixels are individually controlled. When a specific subpixel is displayed, the subpixels adjacent thereto are displayed along with the specific subpixel, so that a pixel is represented as the brightness divided by the specific subpixel and the adjacent displayed subpixels. With this method, more specific expressions of slant lines or curved lines become more possible, improving the resolution.

FIG. 1 is a sectional view of a conventional transflective LCD, which helps to illustrate the operation of such an LCD. As shown in FIG. 1, the LCD 10 includes a lower substrate 100, an upper substrate 160 and a liquid crystal layer 130 interposed therebetween. The upper substrate 160 has a common electrode 140 and a color filter 150 formed thereon. The color filter 150 includes red (R), green (G), blue (B) and white (W) regions 151-154. The lower substrate 100 has an insulating layer 110 and a pixel electrode 120 formed thereon. The pixel electrode 120 has an opaque portion 124 capable of reflecting ambient light and a transparent portion 122 capable of transmitting light from a backlight module 190 disposed at the exterior of the low substrate 100. The liquid crystal layer 130 is interposed between the low substrate 100 and the upper substrate 160. Therefore, the transreflective LCD 10 can display in both reflective and transmissive modes.

The R, G, B and W regions 151-154 respectively provide red, green, blue and white subpixels 11-14 to display different colors. Furthermore, the transmittance of the uncolored region 154 is above 0.9 (or deemed as 1), and that of each of the R, G, and B regions 151-153 is around ⅓. The B region 153 absorbs ⅔ of the ambient light 283 when the ambient light 283 passes through the B region 153. In particular, the B region 153 further absorbs ⅔ of the reflective light 283' when the reflective light 283' passes through the B region 153. That is, the ratio of the reflective light 283' to the incident ambient light 283 is 1:9. However, the transmitting light 273 from the backlight module 190 passes through the B region 153 just one time so that the ratio of the transmitting light 273 to its incident light is 1:3. Similarly, regarding to the W region 154, the ratio of the reflective light 284' to the incident ambient light 284 is above 81:100, and the ratio of the transmitting light 274 to its incident light is above 9:10.

Apparently, the percentages of effective output light of the white subpixel 14 and the subpixels 11-13 are inconsistent in both reflective and transmissive modes. Such an inconsistency gets worse, when the sub-pixel rendering technology is applied to the LCD 10. This leads to different chrominance in reflective regions and transmissive regions, decreasing display quality.

SUMMARY OF THE INVENTION

An objective of the present invention is to provide a transreflective liquid crystal display with improved image quality. The reflective area of the W subpixel is optimized and smaller than that of each of the R, G, and B subpixels so that the percentages of effective output light of the white subpixel and the subpixels are consistent in both reflective and transmissive modes.

The second objective of the present invention is to provide a transreflective liquid crystal display with balanced luminance and chrominance. An uncolored block is inserted into each of the R, G, and B regions on a color filter to increase the transmittance of each of the R, G, and B regions. Therefore, the percentages of effective output light of the white subpixel and the subpixels are consistent in both reflective and transmissive modes.

To achieve the objective, the present invention provides a transreflective liquid crystal display comprising a plurality of pixels. Each pixel includes at least four subpixels including a white subpixel, a red subpixel, a green subpixel and a blue subpixel. Each subpixel comprises a transmissive area and a reflective area. The reflective area of the white subpixel is smaller than that of each of the R, G and B subpixels so that the percentages of effective output light of the white subpixel and the other subpixels are consistent in both reflective and transmissive modes.

The present invention also provides a transreflective liquid crystal display comprising a plurality of pixels and a color filer. Each pixel includes at least four subpixels including a white subpixel, a red subpixel, a green subpixel and a blue subpixel. Each subpixel comprises a transmissive area and a reflective area. An uncolored block is inserted into each of the red, green and blue regions on the color filter, and the uncolored block is located above the reflective area. Therefore, the percentages of effective output light of the white subpixel and the other subpixels are consistent in both reflective and transmissive modes.

BRIEF DESCRIPTION OF THE DRAWINGS

The invention will be described according to the appended drawings in which.

PREFERRED EMBODIMENT OF THE PRESENT INVENTION

Figure 1:
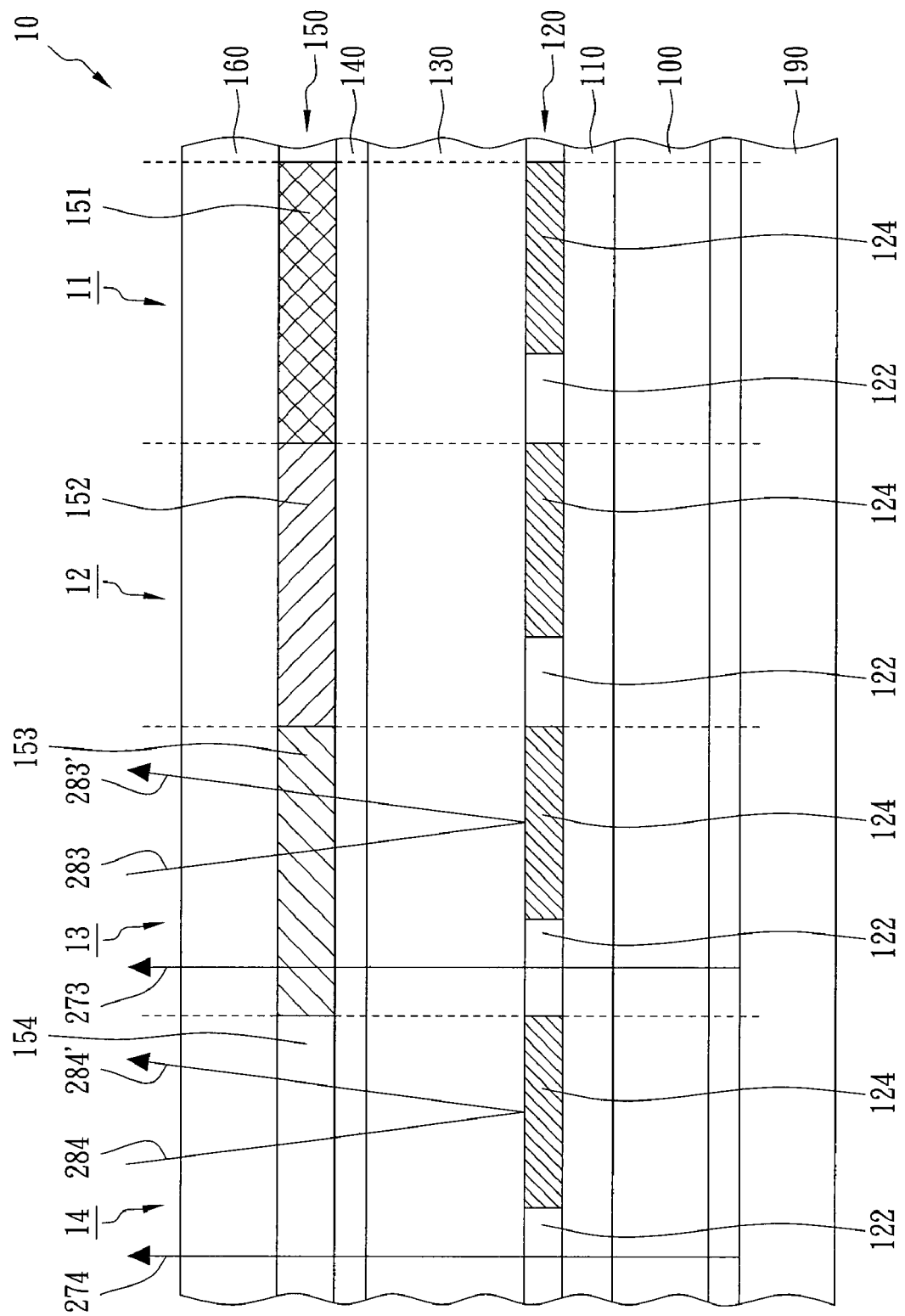
FIG. 1 is a sectional view of a conventional transflective LCD.
Figure 2:
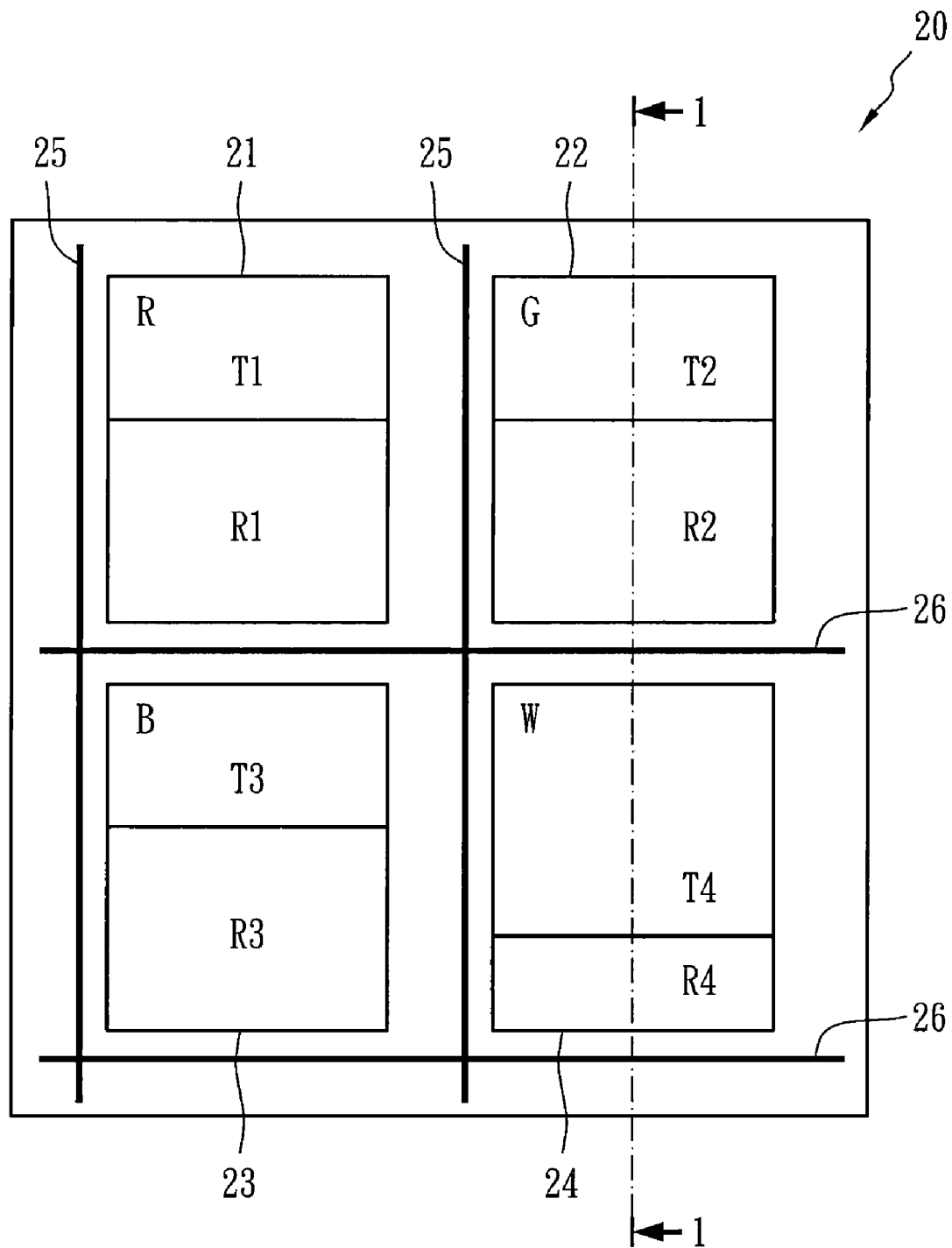
FIG. 2 is a plan view showing the arrangement of one pixel including R, G, B and W sub-pixels according to an embodiment.

FIG. 2 is a plan view showing the arrangement of one pixel including R, G, B and W sub-pixels according to an embodiment. A transreflective liquid crystal display comprises a plurality of pixels. As shown in FIG. 2, a pixel 20 is composed of a red subpixel 21, a green subpixel 22, a blue subpixel 23 and a white subpixel 24 that are arranged in a two-by-two matrix. Two gate lines 26 extend substantially in a transverse direction, while being separated from each other, and transmit gate signals. Two source lines 25 extend substantially in a longitudinal direction and across the gate lines 26, and transmit data voltages.

The red subpixel 21 comprises a transmissive area T1 and a reflective area R1, the green subpixel 22 comprises a transmissive area T2 and a reflective area R2, the blue subpixel 23 comprises a transmissive area T3 and a reflective area R3, and the white subpixel 24 comprises a transmissive area T4 and a reflective area R4. Because the transmittance of the uncolored region on a color filter is much higher that of each of the red, green and blue regions, the ratio of the transmissive area T4 to the reflective area R4 is different from the ratio of the transmissive area (T1, T2 or T3) of a colored subpixel (R, G or B) to the reflective area (R1, R2 or R3) of the colored subpixel and is optimized to have balanced chrominance for the pixel 20 in both reflective and transmissive modes. Especially, sub-pixel rendering in the RGBW is balanced between the reflective and transmissive modes.

Figure 3:
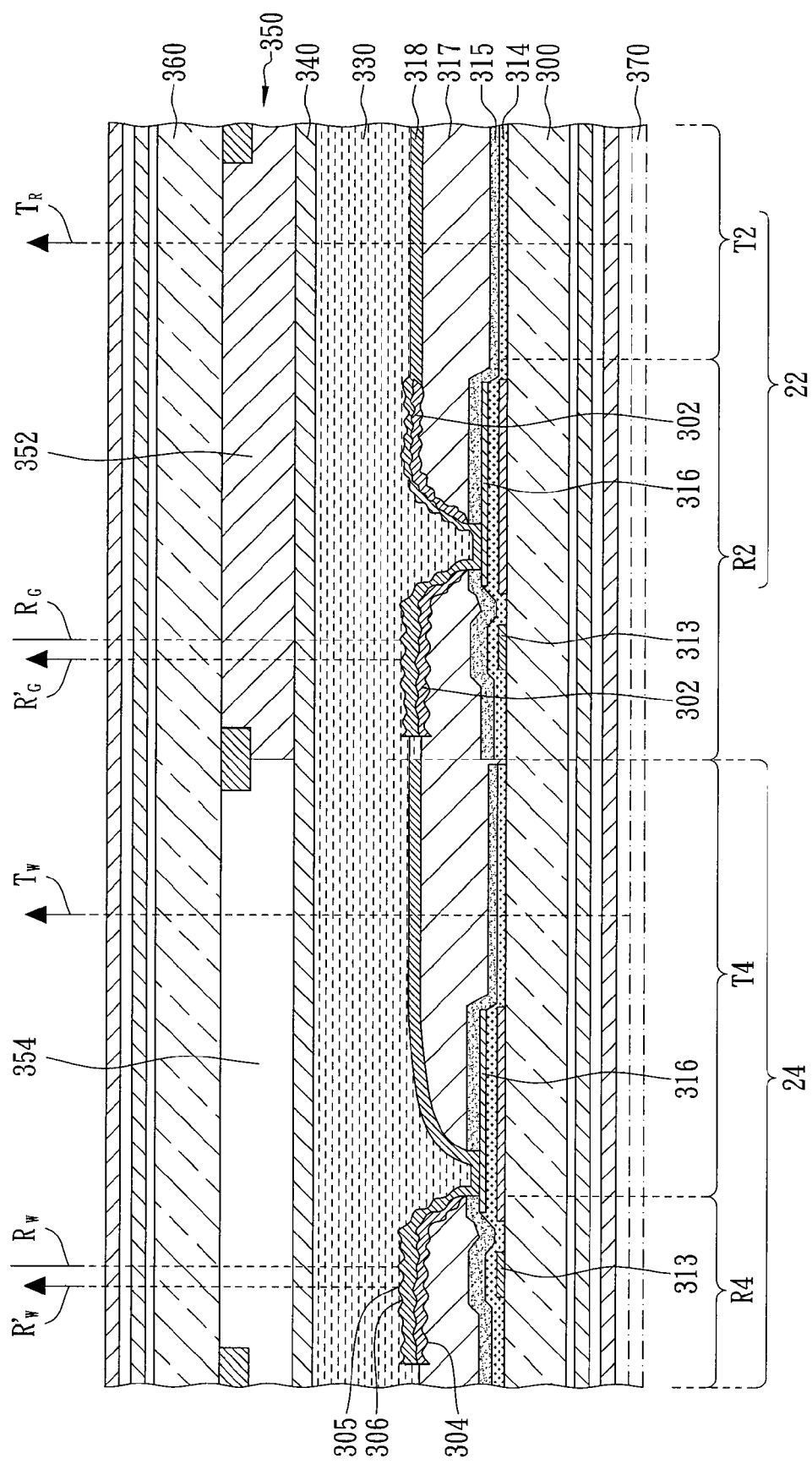
FIG. 3 is partial cross-sectional view taken along the 1-1 of FIG. 2 and shows the structure including a white subpixel and a green subpixel.

FIG. 3 is partial cross-sectional view taken along the 1-1 of FIG. 2 and shows the structure including a white subpixel and a green subpixel. An upper substrate 360 has a common electrode 340 and a color filter 350 formed thereon. As shown in FIG. 3, the color filter 350 includes a green region 352 and an uncolored region 354, but a red region and a blue region of the color filter 350 cannot be illustrated in the same figure. Gate lines 313 are formed on a lower substrate 300 formed of glass, quartz, or the like. A gate insulating layer 314 having an insulation property is formed on the lower substrate 300 and the gate lines 313. A passivation layer 315 is formed on source lines (not shown), capacitance holding electrodes 316 and the gate insulating layer 314. The passivation layer 315 has contact holes (openings) at positions where the passivation layer 315 overlaps the capacitance holding electrodes 316. A plurality of resin layers 317 is overlaid on the passivation layer 315. Reflectors 302 and 304 formed of Al (aluminum), AlNd (Neodymium) or the like and having a reflective function are provided on the resin layers 317, and have a plurality of concave portions 306 and convex portions 305 for scattering light. Pixel electrodes 318 are formed on the reflectors 302 and 304 and the resin layers 317. A liquid crystal layer 330 is interposed between the common electrode 340 and the pixel electrodes 318. Furthermore, the thickness of the liquid crystal layer 330 within the reflective area R2 (or R4) and the thickness of that within the transmissive area T2 (or T4) are different.

The green region 352 absorbs around ⅔ of ambient light $R_G$ when the ambient light $R_G$ passes through the green region 352. In particular, the green region 352 further absorbs ⅔ of the reflective light $R_G'$ when the reflective light $R_G'$ passes through the green region 352. In contrast, the uncolored region 354 absorbs few of ambient light $R_w$ when the ambient light $R_W$ passes through the uncolored region 354. In particular, the uncolored region 354 also absorbs very few of the reflective light $R_W'$ when the incident reflective light passes through the uncolored region 354. Furthermore, the transmitting light $T_G$ from the backlight module 370 passes through the green region 352 just one time so that ⅔ of original incident light is absorbed by the green region 352.

Examples of the optimal design of the areas of the reflectors 302 and 304 are illustrated hereinafter. When the ratio of the reflective areas R1-R3 to the transmissive areas T1-T3 is given as 15:85, the ratio of the reflective area R4 to the transmissive area T4 should be 56:944. Furthermore, when the ratio of the reflective areas R1-R3 to the transmissive areas T1-T3 is changed into 45:55, the ratio of the reflective area R4 to the transmissive area T4 should be 214:786. In other words, the reflective areas R1-R4 and the reflective area R1-R4 should satisfy the equation as follows:

$$\frac{A_{T4} \times n_W}{(A_{T1} + A_{T2} + A_{T3}) \times n_C} = \frac{A_{R4} \times n_W^2}{(A_{R1} + A_{R2} + A_{R3}) \times n_C^2}$$

where $A_{T1}$, $A_{T2}$, $A_{T3}$ and $A_{T4}$ respectively represent the areas of T1-T4, $A_{R1}$, $A_{R2}$, $A_{R3}$ and $A_{R4}$ respectively represent the areas of R1-R4, $n_W$ is the light transmission rate of the uncolored region of the color filter and $n_C$ is the light transmission rate of the colored regions (R, G, B) of the color filter. In the aforesaid examples, $n_c$ is given as ⅓, and $n_W$ is given as 1. If the color of the uncolored region 354 is gray, instead of white, $n_W$ will be smaller than 1.

Further examples of the optimal design of the areas of the reflectors 302 and 304 are illustrated hereinafter.

EXAMPLE A

The relationship between the reflective areas and the transmissive areas of the red, green, blue and white subpixels can be represented as:

$$\frac{T_{N+1} \times n_{N+1}}{\left(\sum_{i=1}^{N} T_i\right) \times \left(\frac{\sum_{i=1}^{N} n_i}{N}\right)} \cong \frac{R_{N+1} \times n_{N+1}^2}{\left(\sum_{i=1}^{N} R_i\right) \times \left(\frac{\sum_{i=1}^{N} n_i}{N}\right)^2}$$

where the transmissive areas of the subpixels are represented by T, the reflective areas of the subpixels are represented by R, the light transmission rates of the red, green and blue regions are represented by $n_i$, the light transmission rates of the uncolored region is represented by $n_{N+1}$, the number of the red, green and blue subpixels is represented by N, and the number of the white subpixel is represented by N+1.

Accompanying the above equation, the relationship between the reflective areas and the transmissive areas of the red, green, blue and white subpixels would be satisfied the inequality as follows:

$$\left| \frac{T_{N+1} \times n_{N+1}}{\left(\sum_{i=1}^{N} T_i\right) \times \left(\frac{\sum_{i=1}^{N} n_i}{N}\right)} - \frac{R_{N+1} \times n_{N+1}^2}{\left(\sum_{i=1}^{N} R_i\right) \times \left(\frac{\sum_{i=1}^{N} n_i}{N}\right)^2} \right| \leq 0.01$$

EXAMPLE B

The relationship between the reflective areas and the transmissive areas of the red, green, blue and white subpixels can be represented as:

$$\frac{T_{N+1} \times n_{N+1}}{\sum_{i=1}^{N} T_i \times n_i} \cong \frac{R_{N+1} \times n_{N+1}^2}{\sum_{i=1}^{N} R_i \times n_i^2}$$

where the transmissive areas of the subpixels are represented by T, the reflective areas of the subpixels are represented by R, the light transmission rates of the red, green and blue regions are represented by $n_i$, the light transmission rates of the uncolored region is represented by $n_{N+1}$, the number of the red, green and blue subpixels is represented by N, and the number of the white subpixel is represented by N+1.

Accompanying the above equation, the relationship between the reflective areas and the transmissive areas of the red, green, blue and white subpixels would be satisfied the inequality as follows:

$$\left| \frac{T_{N+1} \times n_{N+1}}{\sum_{i=1}^{N} T_i \times n_i} - \frac{R_{N+1} \times n_{N+1}^2}{\sum_{i=1}^{N} R_i \times n_i^2} \right| \leq 0.01$$

EXAMPLE C

The relationship between the reflective areas and the transmissive areas of the red, green, blue and white subpixels can be represented as:

$$\frac{T_{N+1}}{T_i} \cong \frac{R_{N+1} \times n_{N+1} \times N}{\sum_{i=1}^{N} n_i}$$

where the transmissive areas of the subpixels are represented by T, the reflective areas of the subpixels are represented by R, the light transmission rates of the red, green and blue regions are represented by $n_i$, the light transmission rates of the uncolored region is represented by $n_{N+1}$, the number of the red, green and blue subpixels is represented by N, and the number of the white subpixel is represented by N+1.

Accompanying the above equation, the relationship between the reflective areas and the transmissive areas of the red, green, blue and white subpixels would be satisfied the inequality as follows:

$$\left| \frac{T_{N+1}}{T_i} - \frac{R_{N+1} \times n_{N+1} \times N}{\sum_{i=1}^{N} n_i} \right| \leq 0.01$$

Figure 4:
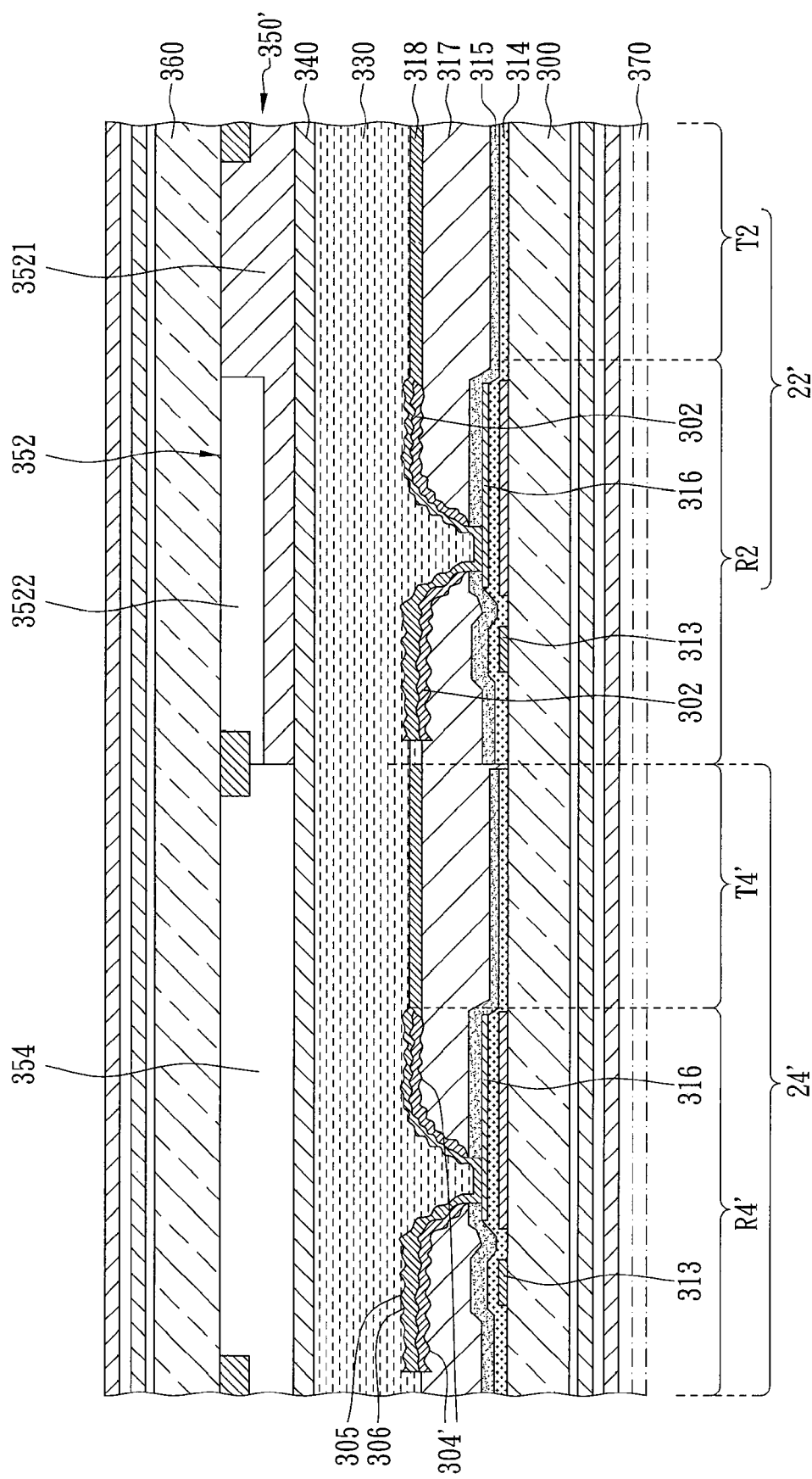
FIG. 4 is cross-sectional view shows another pixel structure including a white subpixel and a green subpixel.

FIG. 4 is cross-sectional view shows another pixel structure including a white subpixel and a green subpixel. Compared with the FIG. 3, the area of reflectors 304' is the same as the area of reflector 302 so that the transmissive area T4' of a white subpixel 24' is substantial equal to the transmissive area T2 of a green subpixel 22. Similarly, the reflective area R4' of the white subpixel 24' is substantial equal to the reflective area R2 of the white subpixel 22. Instead of decreasing the reflective area of the white subpixel, an uncolored block 3522 is inserted into a green region 3521 or the other colored regions, and located above the reflective area R2 so as to balance chrominance between the reflective and transmissive modes.

The above-described embodiments of the present invention are intended to be illustrative only. Numerous alternative embodiments may be devised by persons skilled in the art without departing from the scope of the following claims.

What is claimed is:

1. A transreflective liquid crystal display, comprising:
   a substrate;
   a plurality of pixels formed on the substrate, each pixel comprising a first subpixel and a second subpixel, wherein each of the subpixels comprises a transmissive area and a reflective area, and the reflective area of the first subpixel is smaller than that of the second subpixel; and
   a color filter including a plurality of colored regions respectively above the second subpixels and a plurality of uncolored regions respectively above the first subpixels.

2. The transreflective liquid crystal display of claim 1, wherein the pixels operate with a rendering method.

3. The transreflective liquid crystal display of claim 1, further comprising a first color filter and a second color filter, wherein the second color filter including an uncolored block located above the reflective area.

4. The transreflective liquid crystal display of claim 1, wherein the relationship between the reflective areas and the transmissive areas of the first and second subpixels is represented as:

$$\frac{T_{N+1} \times n_{N+1}}{\left(\sum_{i=1}^{N} T_i\right) \times \left(\frac{\sum_{i=1}^{N} n_i}{N}\right)} \cong \frac{R_{N+1} \times n_{N+1}^2}{\left(\sum_{i=1}^{N} R_i\right) \times \left(\frac{\sum_{i=1}^{N} n_i}{N}\right)^2}$$

where the transmissive area of the subpixel is represented by T, the reflective area of the subpixel is represented by R, a number of the second subpixels is represented by N, a number of the first subpixel is represented by N+1, a light transmission rate of the colored region is represented by $n_i$, and a light transmission rate of the uncolored region is represented by $n_{N+1}$.

5. The transreflective liquid crystal display of claim 1, wherein the relationship between the reflective areas and the transmissive areas of the first and second subpixels is represented as:

$$\left| \frac{T_{N+1} \times n_{N+1}}{\left(\sum_{i=1}^{N} T_i\right) \times \left(\frac{\sum_{i=1}^{N} n_i}{N}\right)} - \frac{R_{N+1} \times n_{N+1}^2}{\left(\sum_{i=1}^{N} R_i\right) \times \left(\frac{\sum_{i=1}^{N} n_i}{N}\right)^2} \right| \leq 0.01$$

where the transmissive area of the subpixel is represented by T, the reflective area of the subpixel is represented by R, a number of the second subpixels is represented by N, a number of the first subpixel is represented by N+1, a light transmission rate of the colored region is represented by $n_i$, and a light transmission rate of the uncolored region is represented by $n_{N+1}$.

6. The transreflective liquid crystal display of claim 1, wherein the relationship between the reflective areas and the transmissive areas of the first and second subpixels is represented as:

$$\frac{T_{N+1} \times n_{N+1}}{\sum_{i=1}^{N} T_i \times n_i} \cong \frac{R_{N+1} \times n_{N+1}^2}{\sum_{i=1}^{N} R_i \times n_i^2}$$

where the transmissive area of the subpixel is represented by T, the reflective area of the subpixel is represented by R, a number of the second subpixels is represented by N, a number of the first subpixel is represented by N+1, a light transmission rate of the colored region is represented by $n_i$, and a light transmission rate of the uncolored region is represented by $n_{N+1}$.

7. The transreflective liquid crystal display of claim 1, wherein the relationship between the reflective areas and the transmissive areas of the first and second subpixels is represented as:

$$\left| \frac{T_{N+1} \times n_{N+1}}{\sum_{i=1}^{N} T_i \times n_i} - \frac{R_{N+1} \times n_{N+1}^2}{\sum_{i=1}^{N} R_i \times n_i^2} \right| \leq 0.01$$

where the transmissive area of the subpixel is represented by T, the reflective area of the subpixel is represented by R, a number of the second subpixels is represented by N, a number of the first subpixel is represented by N+1, a light transmission rate of the colored region is represented by $n_i$, and a light transmission rate of the uncolored region is represented by $n_{N+1}$.

8. The transreflective liquid crystal display of claim 1, wherein the relationship between the reflective areas and the transmissive areas of the first and second subpixels is represented as:

$$\frac{T_{N+1}}{T_i} \cong \frac{R_{N+1} \times n_{N+1} \times N}{\sum_{i=1}^{N} n_i}$$

where the transmissive area of the subpixel is represented by T, the reflective area of the subpixel is represented by R, a number of the second subpixels is represented by N, a number of the first subpixel is represented by N+1, a light transmission rate of the colored region is represented by $n_i$, and a light transmission rate of the uncolored region is represented by $n_{N+1}$.

9. The transreflective liquid crystal display of claim 1, wherein the relationship between the reflective areas and the transmissive areas of the first and second subpixels is represented as:

$$\left| \frac{T_{N+1}}{T_i} - \frac{R_{N+1} \times n_{N+1} \times N}{\sum_{i=1}^{N} n_i} \right| \leq 0.01$$

where the transmissive area of the subpixel is represented by T, the reflective area of the subpixel is represented by R, a number of the second subpixels is represented by N, a number of the first subpixel is represented by N+1, a light transmission rate of the colored region is represented by $n_i$, and a light transmission rate of the uncolored region is represented by $n_{N+1}$.

10. The transreflective liquid crystal display of claim 1, further comprising a plurality of reflectors formed in the reflective areas.

11. The transreflective liquid crystal display of claim 10, further comprising a passivation layer interposed between the reflectors the substrate.

12. The transreflective liquid crystal display of claim 11, further comprising a plurality of resin layers interposed between the reflectors and the passivation layer.

13. The transreflective liquid crystal display of claim 3, wherein the first color filter is white color filter, and second color filter is red, green or blue color filter.

14. The transreflective liquid crystal display of claim 1, further comprising a liquid crystal layer formed on the reflective areas and the transmissive areas, wherein a thickness of the liquid crystal layer on the reflective areas and a thickness of the liquid crystal layer on the transmissive areas are different.

15. A transreflective liquid crystal display, comprising: a plurality of pixels, each pixel comprising a red subpixel, a green subpixel, a blue subpixel and a white subpixel, each of the four subpixels including a transmissive area and a reflective area; and a color filter comprising red regions, green regions, blue regions and uncolored regions, one of the red regions, the green regions and the blue regions including a uncolored block located above one of the reflective areas.

16. The transreflective liquid crystal display of claim 15, wherein a percentage of effective output light of the white subpixel is consistent with that of the other subpixels in one of the pixels upon reflective and transmissive modes.

* * * * *